July 3, 1956            P. GLEY            2,753,132

HELICOPTER SUSTAINED FLUID PROPELLED AIRPLANE

Filed May 9, 1955            2 Sheets-Sheet 1

INVENTOR.
PAUL GLEY
BY Z. O. S. Palley
Patent Agent

July 3, 1956   P. GLEY   2,753,132
HELICOPTER SUSTAINED FLUID PROPELLED AIRPLANE
Filed May 9, 1955   2 Sheets-Sheet 2

INVENTOR.
PAUL GLEY
BY J. O. Palley
Patent Agent

UNITED STATES PATENT OFFICE 2,753,132
Patented July 3, 1956

2,753,132

HELICOPTER SUSTAINED FLUID PROPELLED AIRPLANE

Paul Gley, Rochelle Park, N. J.

Application May 9, 1955, Serial No. 506,820

4 Claims. (Cl. 244—6)

My invention relates to improvements in aircraft. In the heavier-than-air aircraft utilizing propeller type rotors to perform the dual functions of vertical lift and horizontal propulsion, two methods are customary in the art for the control of the force of the horizontal propulsion: one is the tilting of the axis of the rotor, the other is the periodic oscillatory adjustment of the pitch angle of the propeller blades in each revolution of the rotor. As these methods of control must be superimposed on the non-periodic pitch control of the propeller blades regulating the magnitude of the vertical lifting force, they lead to very complicated and costly mechanical constructions.

One of the important objects of my invention is to provide a novel rotor for aircraft, which comprises separate and easily controllable elements for producing the vertical lift and the horizontal travel, resulting in a simpler, more compact, and more economical aircraft, both in first cost and in maintenance.

Another important object of my invention is to provide a rotor for aircraft in which the blades producing the force of horizontal propulsion move in a closely fitting housing designed to guide the air current with the minimum turbulence, resulting in an increased effectiveness of the horizontal propulsion means and in a greater speed of travel of the aircraft.

Another important object of my invention is to provide an aircraft of improved navigability and maneuverability due to the simple, effective, and independent controls of the separate means of the vertical lift and the horizontal propulsion.

Other objects and advantages of my invention will be apparent during the course of the following description.

In the accompanying drawings, forming a part of this application, wherein, for the purpose of illustration, are shown a preferred and also modified forms of my invention, Figure 1 is a perspective view of my aircraft, Figure 2 is a partly sectional plan view of the same, Figure 3 is a vertical sectional view of the wing and the compressor housing, with a side view of the rotor, Figure 4 is a diagrammatic view showing the disposition of the rotors, air inlets and air outlets in the preferred embodiment of my invention, Figure 5 is a diagrammatic view showing the disposition of the rotors, air inlet and air outlet in a modified embodiment of my invention, Figure 6 is a diagrammatic view showing the disposition of the rotors, air inlets and air outlets in another modified embodiment of my invention, Figure 7 is a diagrammatic view showing the disposition of the rotors, air inlet and air outlet in a further modified embodiment of my invention.

In the drawings, wherein like numerals are employed to designate like parts, the numeral 1 designates the fuselage of my aircraft, comprising pilot compartment. The fuselage illustrated in Fig. 1 is spherical with a rearward extending vertical fin. It is, however, within the spirit of my invention to employ a fuselage of other shape and construction.

Referring to Fig. 1, laterally disposed on either side of the fuselage are the wings 2; each of said wings being provided with a vertical fin carrying a rudder 3, connected by a vertical pivot. These rudders are adapted to be turned about their pivots and remote control means are provided to adjust their angular position from the pilot compartment.

Rotatably mounted at the end of each wing 2 is a rotor 4 with a substantially vertical axis. These rotors are rotated in opposite directions by the motors 5, mounted on the ends of the wings 2, through mechanical driving connection which preferably will include a clutch with free-wheeling feature, well known in the art and needing no description. Said rotors 4 may be also connected together by means of a fluid coupling commonly used in the art, whereby, in the event of the breakdown of one of the motors the respective rotor may receive motive power from the motor of the opposite side.

Fig. 1, representing the preferred form of my aircraft, shows two motors, it is, however, within the spirit of my invention to operate both rotors by only one motor through a suitable transmission means, known in the art.

The rotor 4, illustrated in details in Figs. 2 and 3, comprises the following principal parts: the hub 6, carrying the radially arranged propeller blades 7. These propeller blades have journaled mountings in the hub 6, and are angularly adjustable with respect to their plane of rotation. In the preferred form (see Fig. 3), the angular adjustment of the propeller blade 7 is accomplished by means of a control lever 14, attached to the propeller blade and guided by the control ring 15 in such a manner that the vertical sliding of said control ring 15 over the hub 6 will change the angular position of the control lever 14 and the connected propeller blade 7. The raising and lowering of the control ring 14 is effected from the pilot compartment by the control handle 19, which is mechanically connected to the control ring 14 by link 16, lever 17 and rod 18.

Pivotally secured to the end of each propeller blade 7 is the compressor blade 8, which constitutes an important part of the rotor 4, and an essential element of my invention.

Due to their pivotal or hinged mounting, the compressor blades 8 are adjustable in their angular position with respect to their circular path of rotation. When the rotor 4 is revolving around its vertical axis, the compressor blade 8 tends to assume a nearly radial position due to the action of the centrifugal force, and in this position, the compressor blade will force the adjacent air to move tangentially to its path. When, on the other hand, this compressor blade is swung into a position tangential to its circular path by a force counteracting the centrifugal force, it will rotate without affecting appreciably the velocity of the adjacent air and also without causing appreciable frictional air resistance.

The adjustment of the angular position of the compressor blades is accomplished in the preferred form of my aircraft, shown in Figs. 1, 2, and 3, by the guide 12, supported by the wing 2, and positioned to surround the rotor 4. Each guide 12 consists of two semi-circular sections, one of which, disposed externally to the wing 2, is stationary and concentric with the rotor 4; the other, located inside the wing, is slidable toward the fuselage and its position is adjustable from the pilot compartment by means of the control rod 13. (See Fig. 3.)

In one extreme position of this slidable section, shown by the dotted lines in Figs. 2 and 3, the guide 12 forms a perfect circle, concentric with the rotor 4, and of such radius that it restrains the swinging out of the rotating compressor blades 8 from the tangential position. In the preferred form of my aircraft, this restraining force is applied by direct contact between the guide 12 and the grooved external portion of the compressor blade 8, as illustrated in Fig. 3, and the compressor blade is made of strong and light plastics or metal which can stand the direct application of this restraining force without harmful effects.

When the slidable section of the guide 12 is moved toward the fuselage, by means of the control rod 13, the compressor blade 8, moving on its circular path, when it reaches this slidable section of the guide will swing out, due to the centrifugal force, into the positions shown in Fig. 2. The direction of the rotation of the rotor is such that the compressor blades 8, when passing alongside the slidable section of the guide 12, will move from the front toward the rear of the aircraft. The adjacent ends of the stationary and slidable sections of the guide 12 are interleaved so that the continuity of the guide is preserved in all positions of the slidable section.

Another essential element of my invention is the compressor housing 9, located inside the wing 2, and containing the slidable section of the guide 8. This housing 9, shown in Figs. 2 and 3, is designed to enclose the compressor blades, during the rearward part of their circular motion, with the minimum clearance, and it is provided with air inlet openings 10 located at the leading edge of the wing 2, and air outlet openings 11 located at the trailing edge of the wing, adjacent to the rudder 3. These inlet and outlet openings and the compressor housing 9 are so constructed as to guide the moving air with the minimum of friction and turbulence.

It is to be understood that, instead of the above-described external guide 12, the same control of the compressor blades 8 may be accomplished, within the spirit of my invention, by an equivalent central guide or cam, located at the hub 6, and changing the angular position of the blades 8 by known power-transmitting means.

In the above-described, preferred embodiment of my invention each of the rotors has a separate compressor housing 9, with separate inlet openings 10 and outlet openings 11. This arrangement is shown diagrammatically in Fig. 4.

Figure 1:
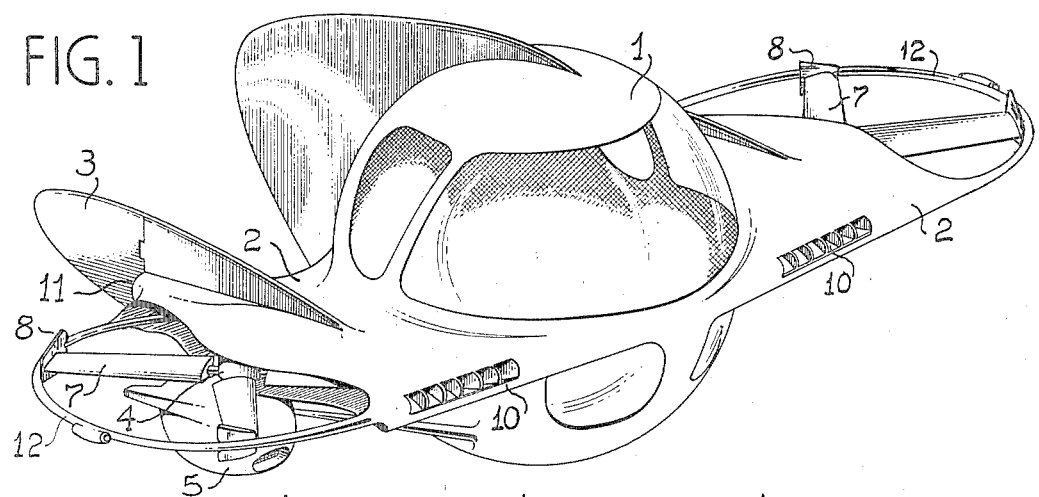
Figure 2:
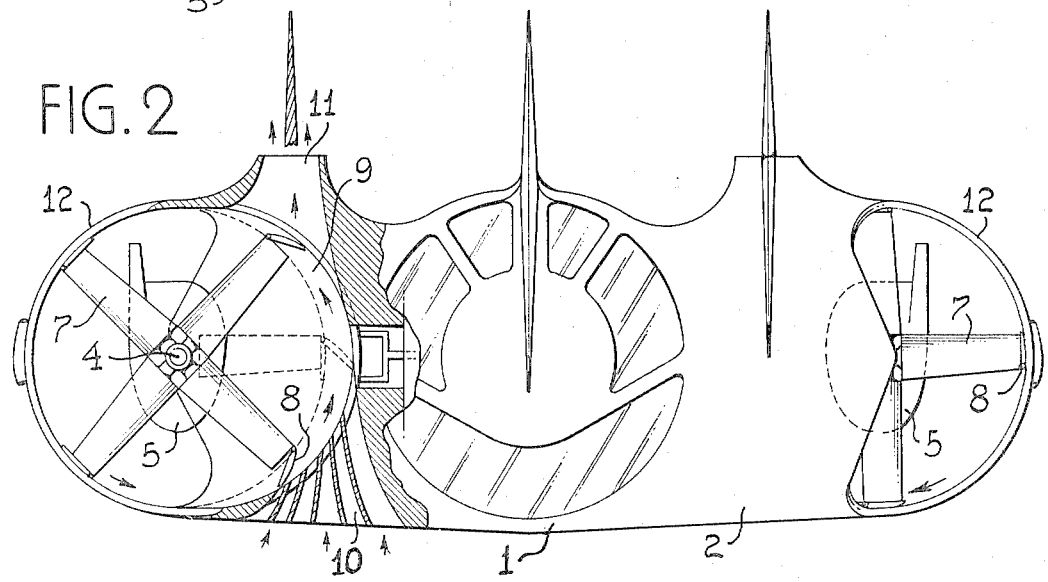
Figure 3:
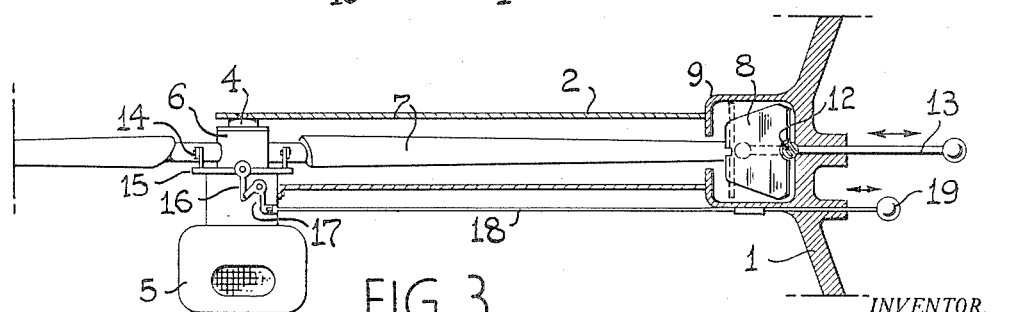
Figure 4:
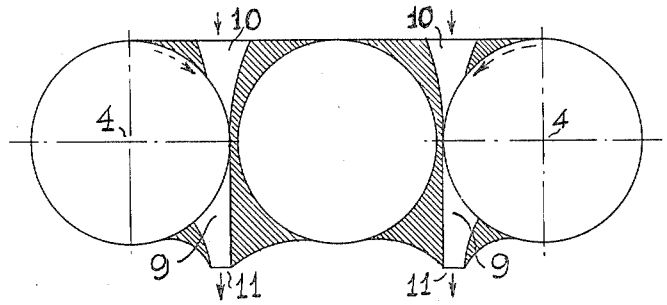
Figure 5:
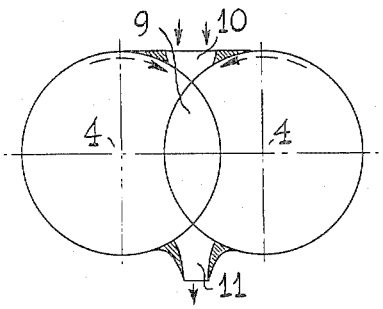
Fig. 5 is a diagrammatic view of a modified embodiment of my invention, in which the two rotors have a common compressor housing. Another feature is that the paths of the two rotors overlap, which is made possible by the proper synchronization of the two rotors and by a common drive.
Figure 6:
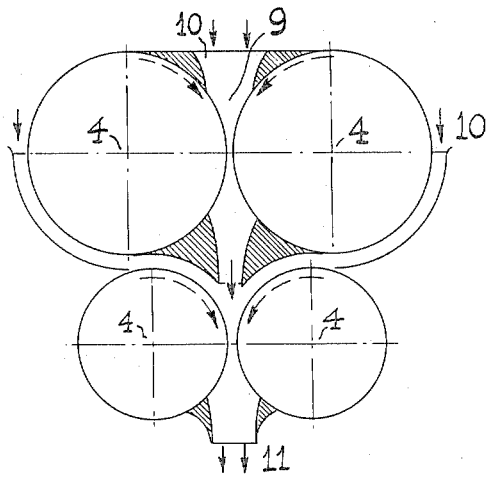
Fig. 6 shows another modified embodiment with two pairs of rotors in tandem arrangement, in which the air discharged from the first housing enters the housing of the second rotor-pair for a second stage compression.
Figure 7:
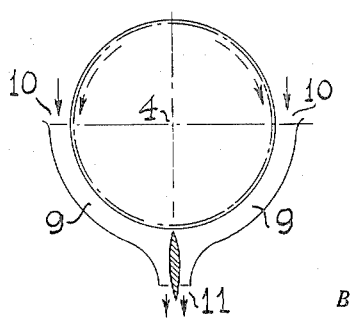
Fig. 7 illustrates another modification having the two rotors revolving in opposite directions around a common axis, and having separate air inlets and a common air outlet.

As a further modification, the outer ends of the propeller blades 7 may be connected by an inertia ring for fly-wheel effect, and the compressor blades 8, the number of which may be different from the number of propeller blades, may be mounted on said inertia ring with pivotal connections.

It is to be understood that the embodiments and forms of my invention, herewith shown and described, are to be taken as examples of same, and various changes in the shape, size, and arrangement of parts may be resorted to, without departing from the spirit of my invention and the scope of the subjoined claims.

Regarding the operation of my aircraft the underlying principle of my invention is that the functions of the vertical lift and of the horizontal propulsion are performed by separately and independently controlled components of the rotor.

The force for the vertical lift is obtained by the action of the propeller blades. The magnitude of this lifting force, at a given speed of rotation of the rotor, will depend on the angle of incidence of the propeller blades which can be adjusted at the will of the pilot by a very simple means of control, herewith shown and described. As the propeller blades are not required to produce a horizontal force, there is no necessity for the tilting of the axis of the rotor or for a periodic oscillation of the propeller blades in each revolution.

The force for the horizontal propulsion is obtained by the compressor blades of the rotor, and the magnitude of this force can be regulated at the will of the pilot by a simple control means. These compressor blades have a periodic oscillation in each turn of the rotor, but as these compressor blades have considerable smaller mass than the propeller blades, this can be accomplished by simpler and lighter means. Furthermore, these propeller blades have very high efficiency due to the fact that they move in a housing of aerodynamic design, the result of which is an increase in the speed of the horizontal travel of the aircraft.

My aircraft will have also excellent navigability and maneuverability due to the simple and independent control of the vertical and horizontal forces produced by the dual rotors.

I claim:

1. An aircraft comprising, a fuselage; dual wings laterally secured to said fuselage; dual compressor housings, each mounted within one of said wings, and having inlet openings at the front, and outlet openings at the rear of said wings; motor operated dual rotors, each rotatably mounted at the end of one of said wings, with a vertical axis; plurality of propeller blades, radially mounted on said rotors, with journaled connection permitting their angular adjustment with respect to the axis of the rotor; control means operatively connected to said propeller blades to effect their angular adjustment; plurality of compressor blades, each attached to the outer end of one of said propeller blades by pivoted connection permitting the rotating compresor blade to swing out from the tangential position toward the radial position due to the action of the centrifugal force, said compressor blades being so adapted that they pass, due to the rotation of said rotor, through said compressor housing from the front to the rear; dual guides, each carried by one of said wings and surrounding one of said rotors, and comprising a stationary section adapted to hold said compression blades in their tangential position, and a slidable section, being adjustable so that in one extreme position it holds said compressor blades in their tangential position, and in the other, adjusted, positions of said slidable section it permits the swinging out of said compressor blades to predetermined angular positions, said slidable section being located within said compression housing; control means, operatively connected to said slidable section, and being adapted to regulate the angular swinging of said compressor blades when passing through said compressor housing.

2. An aircraft comprising, a fuselage; wings secured to said fuselage; compressor housing located inside said wings and having inlet opening in the front, and outlet opening in the rear of said wings; motor operated rotors, with vertical axis, rotatably mounted on said wings; plurality of propeller blades having journaled connections with said rotors permitting angular adjustment; control means, operatively connected to said propeller blades for their angular adjustment; plurality of compressor blades carried by said rotor, with pivoted connection permitting their swinging from the tangential position toward the radial position, said compressor blades being so adapted that they pass, due to the rotation of said rotor, through said compressor housing from the front to the rear; adjustable guides, operatively connected to said compressor blades and being adapted to keep said compressor blades in their tangential position when moving outside of said compressor housing, and to permit their swinging from the tangential position into variable predetermined angular positions when said compressor blades pass through said compressor housing; control means, operably connected to said adjustable guide, to regulate the angular swinging of said compressor blades.

3. In an aircraft having a wing, the combination comprising a compressor housing located within said wing, a motor operated rotor rotatably carried by said wing; propeller blades carried by said rotor with journaled mountings for angular adjustment; control means operatively connected to said propeller blades for their angular adjustment; compressor blades carried by said rotor with pivoted mountings permitting their swinging from the tangential position toward the radial position, said compressor blades being adapted to pass, due to the rotation of said rotor, through said compressor housing from the front to the rear; adjustable guide, operatively connected to said compressor blades, and being adapted to keep said compressor blades in their tangential position when moving outside of said compressor housing, and to permit their swinging from the tangential position into variable, predetermined angular positions when said compressor blades pass through said compressor housing; control means operatively connected to said adjustable guide and adapted to regulate the angular swinging of said compressor blades.

4. An aircraft having a wing; a motor operated rotor carried by said wing and having a substantially vertical axis; plurality of propeller blades with journaled connection with said rotor for angular adjustment; control means for angular adjustment of said propeller blades to regulate the vertical lifting force; plurality of compressor blades, carried by said rotor, with pivoted connections permitting their swinging from their tangential position toward the radial position; regulating means operatively connected to said compressor blades and being adapted to effect the swinging out of said compressor blades from the tangential toward the radial position when they recede from the line of travel of the aircraft, and to keep said compressor blades in their tangential position in the remaining portion of their path.

References Cited in the file of this patent

UNITED STATES PATENTS

| 1,741,578 | Lyons | Dec. 31, 1929 |
| 1,793,909 | Curioni | Feb. 24, 1931 |
| 2,635,833 | Rzepela | Apr. 21, 1953 |

FOREIGN PATENTS

| 176,803 | Switzerland | July 16, 1935 |